United States Patent [19]

Lee et al.

[11] Patent Number: 4,704,248
[45] Date of Patent: Nov. 3, 1987

[54] HIGH PERFORMANCE FUEL ELEMENT WITH END SEAL

[75] Inventors: Gary E. Lee; Gordon J. Zogg, both of San Diego, Calif.

[73] Assignee: The United States of America as represented by the United States Department of Energy, Washington, D.C.

[21] Appl. No.: 683,013

[22] Filed: Dec. 18, 1984

[51] Int. Cl.<sup>4</sup> .......................... G21C 3/02; G21C 5/02
[52] U.S. Cl. ..................................... 376/427; 376/433
[58] Field of Search ............... 376/383, 427, 433, 459, 376/385, 389

[56] References Cited

U.S. PATENT DOCUMENTS

| | | | |
|---|---|---|---|
| 3,318,779 | 5/1967 | Turner et al. | 376/427 |
| 3,413,196 | 11/1968 | Fortescue et al. | 376/427 |
| 3,676,297 | 7/1972 | Rennie et al. | 376/427 |
| 3,781,190 | 12/1973 | Rapier | 376/433 |
| 4,060,454 | 11/1977 | Miertschin et al. | 376/427 |
| 4,076,775 | 2/1978 | Hackstein et al. | 376/427 |
| 4,092,498 | 5/1978 | Lewis | 376/427 |
| 4,547,334 | 10/1985 | Brogli et al. | 376/433 |

FOREIGN PATENT DOCUMENTS 51-41198 4/1976 Japan .................................. 376/427

Primary Examiner—Deborah L. Kyle
Assistant Examiner—Richard L. Klein
Attorney, Agent, or Firm—Fitch, Even, Tabin & Flannery

[57] ABSTRACT

A nuclear fuel element comprising an elongate block of refractory material having a generally regular polygonal cross section. The block includes parallel, spaced, first and second end surfaces. The first end surface has a peripheral sealing flange formed thereon while the second end surface has a peripheral sealing recess sized to receive the flange. A plurality of longitudinal first coolant passages are positioned inwardly of the flange and recess. Elongate fuel holes are separate from the coolant passages and disposed inwardly of the flange and the recess. The block is further provided with a plurality of peripheral second coolant passages in general alignment with the flange and the recess for flowing coolant. The block also includes two bypasses for each second passage. One bypass intersects the second passage adjacent to but spaced from the first end surface and intersects a first passage, while the other bypass intersects the second passage adjacent to but spaced from the second end surface and intersects a first passage so that coolant flowing through the second passages enters and exits the block through the associated first passages.

1 Claim, 5 Drawing Figures

HIGH PERFORMANCE FUEL ELEMENT WITH END SEAL

This invention was made with Government support under Contract DE-AT03-76SF70046 awarded by the Department of Energy. The Government has certain rights in this invention.

The present invention relates to fuel elements used in nuclear reactors and, more particularly, to a high performance fuel element including components for forming a peripheral seal and additional coolant passages aligned with, but not communicating coolant to, the sealing components.

BACKGROUND OF THE INVENTION

It is conventional in the nuclear reactor art, and in particular in high temperature gas cooled reactors, to provide a reactor core made up of a number of core blocks or elements which are stacked in columns. The core elements may include fuel elements and control rod elements. An example of such a fuel block or element is disclosed in U.S. Pat. No. 4,060,450 which illustrates and describes a fuel element or block comprised substantially of graphite and having generally cylindrical passages or channels therethrough for receiving fuel rods or rod segments and facilitating passage of coolant through the fuel element. Other blocks or elements are for accommodating control rods and are similar in exterior shape but generally include channels for control rods, reserve shutdown pellets or power rods which include a neutron absorbing material, such as boron carbide, and function to control operation of the reactor core.

In high temperature gas cooled reactors employing prismatic fuel and control elements having generally planar end surfaces, gaps may form at the interface between stacked elements allowing coolant leakage flow into and out of the element coolant channels. Should a gap be created between adjacent fuel elements, the coolant leakage into and out of the nearest coolant channels can result in undesirable maldistribution of coolant within the fuel elements.

In order to prevent or at least substantially reduce such coolant leakage, it has been proposed to provide a dependent peripheral flange on one end surface of the element and a mating recess on the other to align the coolant passages of the stacked elements and form a peripheral seal. For further information regarding the structure and operation of such fuel elements, reference may be made to U.S. Pat. No. 3,413,196, particularly to FIG. 5. The effectiveness of the seal is, in part, a function of the thickness of the flange. However, as flange thickness increases, the relative core power density decreases because a continuation of the normal fuel hole and coolant passage pattern is not possible in the region underlying the flange without degrading the operation of the seal.

SUMMARY OF THE INVENTION

Among the several objects of the present invention may be noted the provision of an improved high performance fuel element for a high temperature gas cooled reactor. The fuel element has increased core power density by including fuel holes and accompanying coolant passages in the region underlying the flange, but without compromising the sealing function and without mechanically weakening the flange. Stacked fuel elements are proportioned to define plenums therebetween so that a single blockage in one coolant passage in one element does not render inoperative vertically aligned passages in other elements because the presence of the plenums enables communication of coolant through all passages opening onto it to shunt around the blockage. Other aspects and features of the present invention will be, in part, apparent and, in part, pointed out in the following specification and in the accompanying claims and drawings.

Briefly, the fuel element of the present invention includes an elongate block having substantially parallel, spaced, first and second end surfaces. The first end surface has a peripheral sealing flange while the second end surface has a peripheral sealing recess sized to receive the flange. The block has a plurality of first coolant passages disposed inwardly of the flange and recess and a plurality of elongate fuel holes disposed inwardly of the flange and recess. The block also includes a plurality of peripheral longitudinal second coolant passages extending intermediate the end surfaces and in general alignment with the flange and the recess. The block includes two bypasses for each peripheral coolant passage. One bypass intersects the peripheral passage adjacent the first end surface and intersects a first passage, and the other bypass intersects the second passage adjacent the second end surface and intersects a first passage so that coolant flowing through the second passages enters and exits the block through the first coolant passages.

BRIEF DESCRIPTION OF THE DRAWINGS

Corresponding reference characters indicate corresponding components throughout the several views of the drawings.

DESCRIPTION OF THE PREFERRED EMBODIMENT

Figure 1:
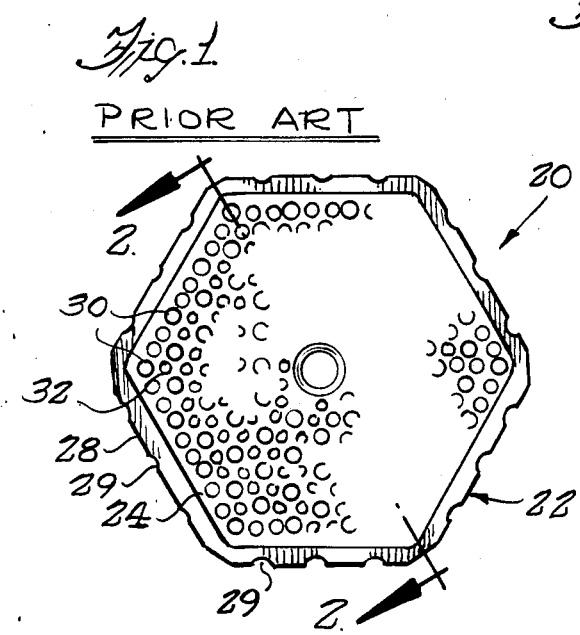
FIG. 1 is a plan view of a standard fuel element having a peripheral sealing flange.
Figure 2:
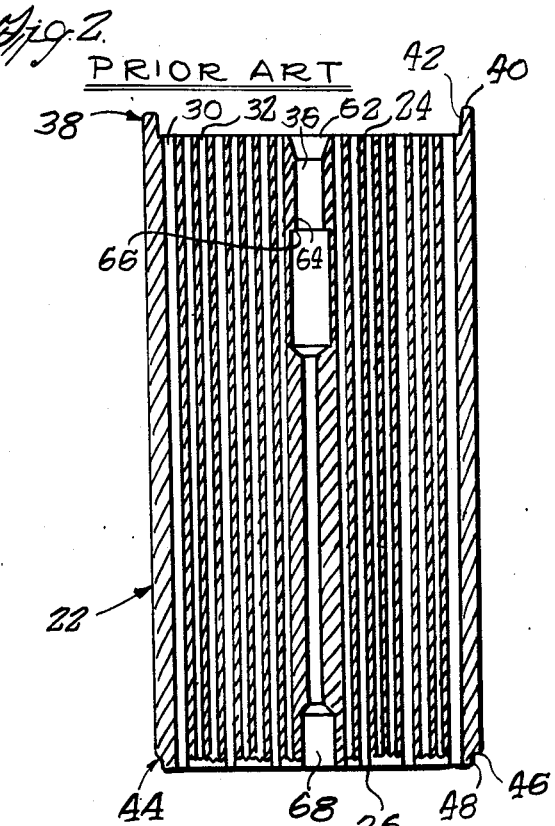
FIG. 2 is a sectional view of the fuel element taken generally along line 2—2 in FIG. 1.
Figure 3:
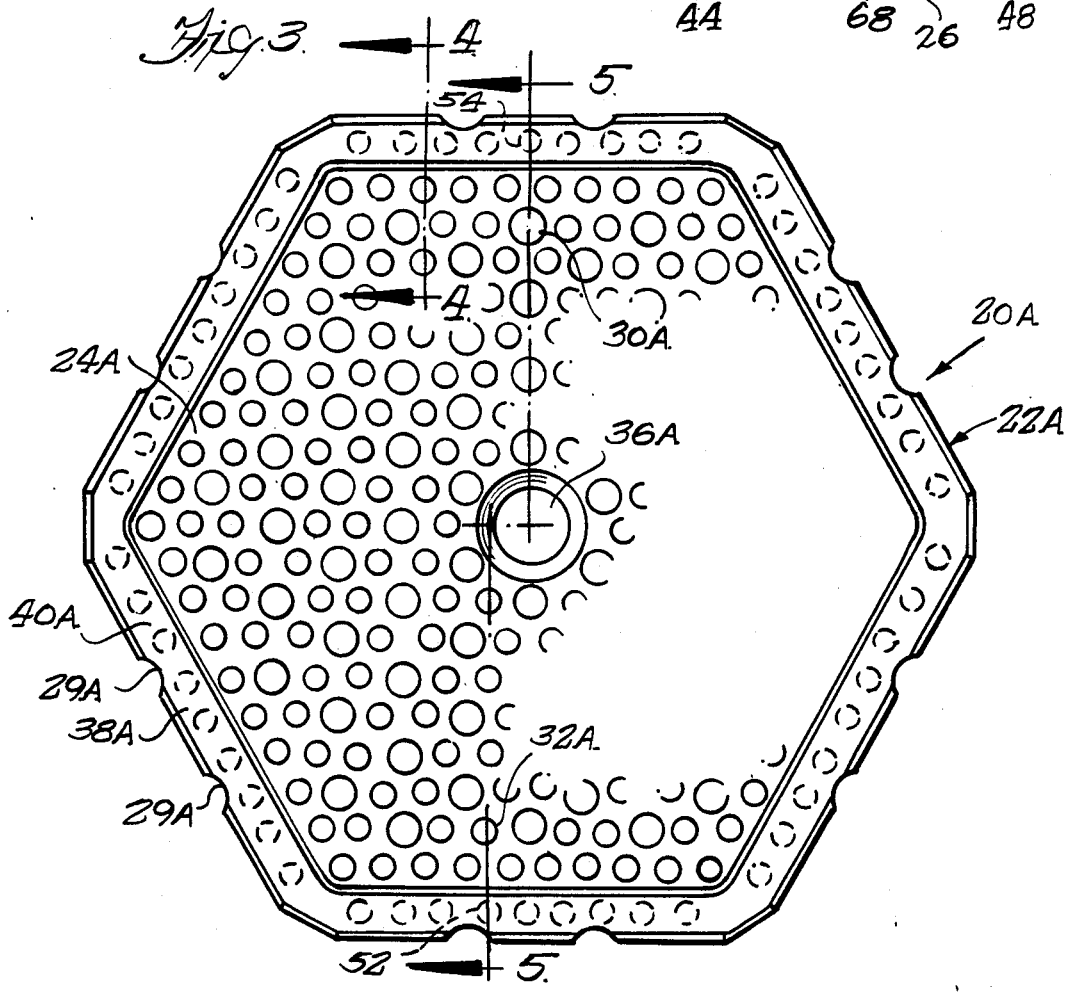
FIG. 3 is a plan view of stacked high performance fuel elements of the present invention.
Figure 4:
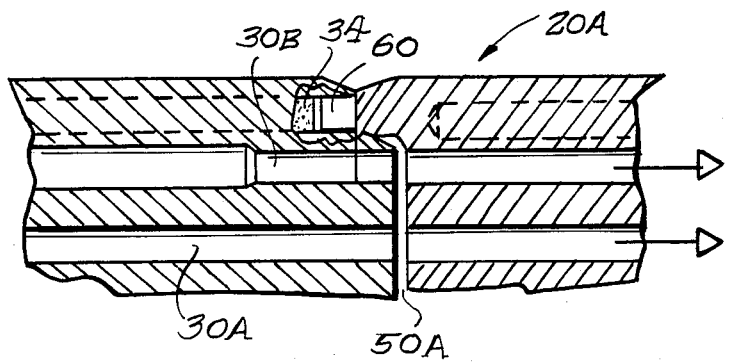
FIG. 4 is a partial sectional view of the high performance fuel elements taken generally along line 4—4 of FIG. 3.
Figure 5:
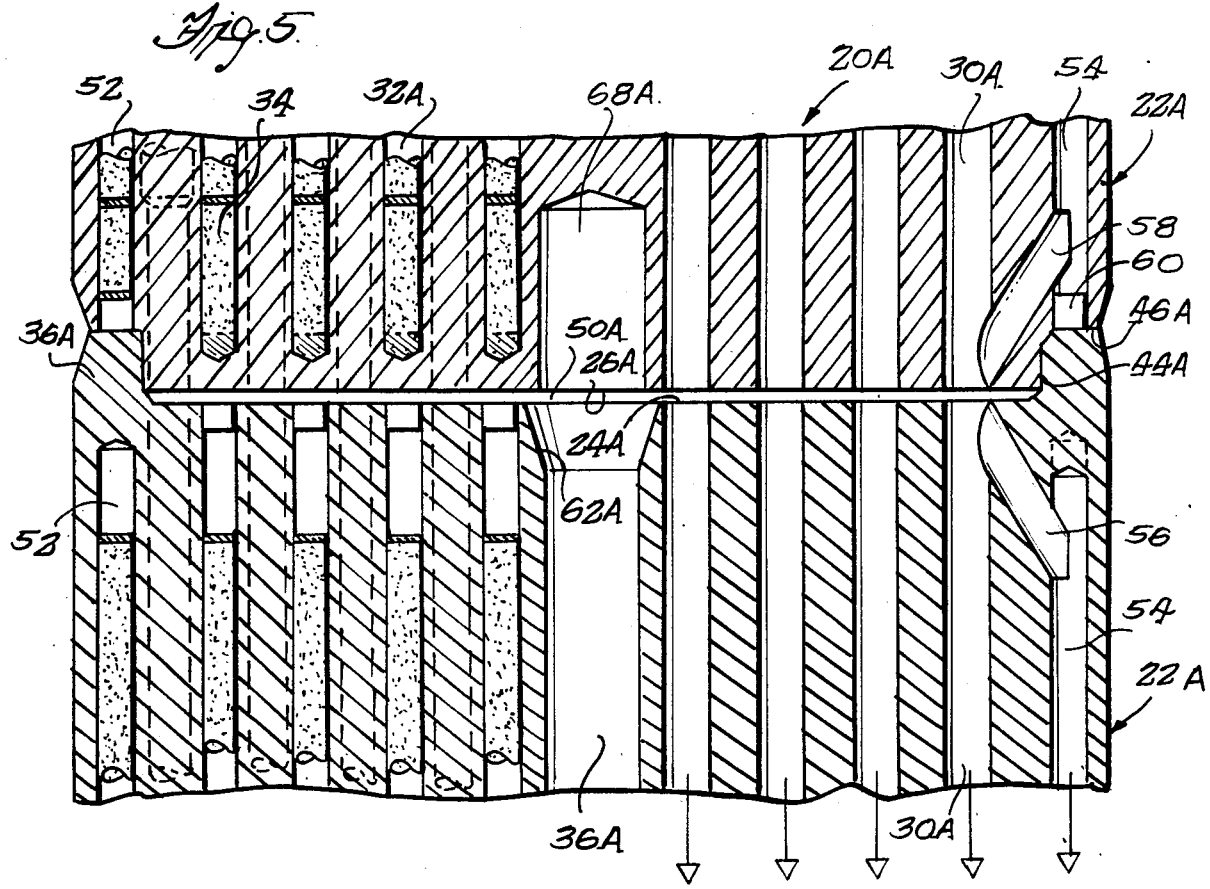
FIG. 5 is a partial sectional view of the high performance fuel elements taken generally along line 5—5 of FIG. 3.

Referring now to the drawings, a high performance fuel element of the present invention is generally indicated by reference character 20A in FIGS. 3-5. Before discussing the high performance fuel element in detail it would be illustrative to describe a standard fuel element, shown in FIGS. 1 and 2, over which the high performance fuel element 20A is an improvement.

The standard fuel element 20, the subject of commonly assigned, copending U.S. patent application Ser. No. 414,437, filed Sept. 2, 1982, includes an elongate block 22 made of refractory material, such as graphite, and having a prismatic configuration. More specifically, it has a generally regular polygonal cross section (hexagonal) and includes substantially parallel, spaced first and second end surfaces 24, 26, respectively, and an outer peripheral side surface 28. The side surface 28 has a number of regularly spaced generally semicylindrical recesses 29 formed longitudinally along each planar portion thereof. When stacks of fuel elements 20 are placed next to one another in the reactor core, coolant channels are formed by the recesses 29 through which the reactor core coolant, e.g. helium, may pass. Thus no matter how closely adjacent planar portions of side surfaces 28 of blocks in adjacent stacks are positioned, coolant can pass between the vertical stacks of the blocks 22.

The block has a number of longitudinal cylindrical passages 30 therethrough for flowing a coolant, such as helium, during operation of the associated reactor core. The block also has a number of longitudinal cylindrical holes or blind bores 32 to receive generally cylindrical fuel rods or segments similar to rods or segments 34 shown in FIG. 5. These fuel rods comprise nuclear fuel particles having a core of fissile and/or fertile material surrounded by a ceramic shell. These particles are embedded in a matrix which comprises a mixture of graphite flour and a suitable binding pitch, as is known in the art. The fuel blocks may have central openings 36 serving as a tooling hole or a fuel handling hole. The hole 36 is drilled from the first end surface 24 and includes a funnel entry 62 for guiding entry of the handling tool. The hole has a lip 64 at an enlarged part of the hole, having a surface 66 for engagement by components of the handling tool. A positioning hole 68 is drilled from the second end surface 26 and serves in the positioning of the block 22 while the handling hole 36 is formed. Other holes, not illustrated, may be provided in the block for the purpose of accommodating reactor control rods, reserve shutdown pellets and/or power rods including neutron absorbing material, for controlling operation of the reactor in a conventional manner.

A raised peripheral sealing flange, indicated generally at 38, is formed, as by machining, on the first end surface 24 of the fuel element 20. The sealing flange 38 has an upper planar sealing surface 40 and an inner polygonal boundary surface 42 inclined slightly outwardly.

The second end surface 26 of the fuel element 20 has a polygonal sealing recess, indicated generally at 44, formed thereon, as by machining, which in the illustrated embodiment takes the form of a generally hexagonal plan shaped planar base surface 46 and a hexagonal longitudinally extending peripheral boundary surface 48. The sealing recess is sized to receive the flange 38 and the recess peripheral boundary surface 48 is bevelled, inclined inwardly from base surface 46, to promote ease of stacking and separation of the blocks 22. When the blocks are vertically stacked, planar sealing surface 40 of the flange and planar base surface 46 of the recess are in full surface contact to effect a seal to limit coolant leakage.

While the standard fuel element 20 works satisfactorily for its intended purpose, a price is paid for the provision of the sealing components. The block 22 has a thick rim between the flange and the recess. It is desirable to provide additional fuel and coolant holes in the region underlying the flange 38. However, a continuation of the normal fuel and coolant hole pattern here would interfere with and compromise the integrity of the seal.

Referring to FIGS. 3–5, the fuel element 20A of the present invention is shown. Components of the fuel element 20A corresponding to components of fuel element 20 are indicated by the reference numeral applied to the component of the fuel element 20 with the addition of the suffix "A". As with the standard fuel element, the length of the flange 38A is preferably somewhat greater than the depth of the recess 44A so that when two of the blocks 22A are stacked, a plenum 50A is formed. The plenum 50A is continuous and uninterrupted because within the flange and recess, the first end surface 24A of one block 22A and the facing second end surface 26A of the other block 22A are substantially planar and parallel. Thus a blocked coolant passage 30A in one block does not render inoperative all aligned coolant passages in other stacked blocks because the presence of the plenums permits coolant to be shunted around the blockage.

Besides having the plurality of first coolant passages 30A and the plurality of first fuel holes 32A positioned inwardly of the flange 38A and the recess 44A, the block 22A has a plurality of spaced elongated second fuel holes 52 disposed adjacent the periphery of the block. These fuel holes 52 extend intermediate the end surfaces 24A, 26A in general alignment with the flange 38A and the recess 44A. To assist in removing the additional heat resulting from the provision of the additional fuel holes, the block 22A also has a plurality of longitudinal second coolant passages 54. The coolant passages 54 are positioned adjacent the periphery of the block 22A. They extend intermediate the end surfaces 24A, 26A and are in general alignment with the flange and the recess.

Each coolant passage 54 is preferably located adjacent to and corresponds to one of the coolant passages 30A to form a pair. The block 22A further has two bypasses for each pair of coolant passages. A first bypass 56 intersects the associated passage 54 near to but spaced from the first end surface 24A, while second bypass 58 intersects the associated passage 54 near to but spaced from the second end surface 26A. Each bypass preferably extends at an angle of between 20 degrees and 40 degrees relative to the axis of its associated peripheral coolant passage 54. Alternatively, the bypasses could be arranged to intersect different coolant passages 30A. In another modification, the bypasses 56, 58 could be drilled from respective end surfaces 24A, 26A without intersecting any interior coolant passage 30A.

The peripheral fuel holes 52 and coolant passages 54 are preferably formed by drilling from the recess base surface 46A. They terminate short of the flange 38A so not to degrade its mechanical strength. Each passage 54 is blocked by a plug 60 between its intersection with the bypass 58 and the recess surface 46A.

The incorporation into the block 22A of the peripheral fuel holes 52 and peripheral coolant passages 54 with their associated bypasses 56 and 58, permits a significant increase in the core power density without an increase in its size. Furthermore, the presence of the additional coolant passages does not degrade the peripheral seal because coolant flowing through the passages 54 enters and leaves the block 22A through the paired interior coolant passages 30A.

By way of example, the standard fuel element 20 could contain a total of 2052 fuel rods. A high performance fuel element 20A of the present invention, of the same size, can accommodate a total of 2448 fuel rods, a nineteen percent increase. The peripheral coolant passages 54 are shown having a slight reduction in diameter compared to coolant passages 30A. This arrangement permits high performance fuel element 20A to have the same envelope and the same pitch between inner passages and holes as does the standard fuel element 20.

However if maintenance of the same size is not required, larger peripheral coolant passages can be provided.

As shown in FIG. 4, coolant passages 30B adjacent the rim 38A could be of reduced diameter to further strengthen the rim. However reduced diameter passages 30B are preferably not paired with the peripheral coolant passages 54.

In view of the above, it will be seen that the several objects of the invention are achieved and other advantageous results attained.

As various changes could be made without departing from the scope of the invention, it is intended that all matter contained in the above description shall be interpreted as illustrative and not in a limiting sense.

What is claimed is:

1. A pair of generally vertically stacked prismatic fuel elements disposed in a nuclear reactor, each of said elements being substantially identical and comprising:

a block of refractory material, such as graphite, having substantially parallel spaced first and second end surfaces, said first end surface having a peripheral sealing flange formed thereon extending away from said second surface, and said second end surface having a peripheral sealing recess sized to receive said flange, said block having a plurality of longitudinal first coolant passages therethrough disposed inwardly of said flange and said recess coolant, said block further including a plurality of peripheral longitudinal second coolant passages extending intermediate said end surface and in general alignment with said flange and recess, each of said second coolant passages having a first end and a second end with each end of each of said second coolant passages being blocked, said block further comprising two bypasses for each of said second passages, one bypass intersecting the second passage adjacent but spaced from said first end surface and intersecting a first passage, and the other bypass intersecting the second passage adjacent but spaced from said second end surface and intersecting a first passage, the extent of said flange being greater than the depth of said recess so that a plenum is defined by facing first and second end surfaces, said plenum being uninterrupted within the flange of the first end surface defining the plenum.

* * * * *